(12) United States Patent
Martin et al.

(10) Patent No.: US 12,090,909 B2
(45) Date of Patent: Sep. 17, 2024

(54) MULTI-VEHICLE TRANSPORT TRAILER

(71) Applicant: BCL Roadrunner LLC, Airway Heights, WA (US)

(72) Inventors: James Bradford Martin, Nine Mile Falls, WA (US); Kurt Warren Hankins, Brookfield, MO (US)

(73) Assignee: BCL ROADRUNNER LLC, Airway Heights, WA (US)

( * ) Notice: Subject to any disclaimer, the term of this patent is extended or adjusted under 35 U.S.C. 154(b) by 897 days.

(21) Appl. No.: 17/168,401

(22) Filed: Feb. 5, 2021

(65) Prior Publication Data
US 2022/0250529 A1   Aug. 11, 2022

(51) Int. Cl.
*B60P 3/08* (2006.01)
*B60P 3/07* (2006.01)

(52) U.S. Cl.
CPC .. *B60P 3/07* (2013.01); *B60P 3/08* (2013.01)

(58) Field of Classification Search
CPC ..................................... B60P 3/07; B60P 3/08
USPC ............. 410/24, 24.1, 26, 27, 28, 28.1, 29.1
See application file for complete search history.

(56) References Cited

U.S. PATENT DOCUMENTS

| | | | | |
|---|---|---|---|---|
| 6,491,484 B2* | 12/2002 | Kubota | ..................... | B60P 3/08 |
| | | | | 410/24 |
| 2007/0059118 A1* | 3/2007 | Chang | ....................... | B60P 3/08 |
| | | | | 410/24 |
| 2008/0008552 A1* | 1/2008 | Boydstun | .................. | B60P 3/08 |
| | | | | 410/24 |

* cited by examiner

*Primary Examiner* — Stephen T Gordon
(74) *Attorney, Agent, or Firm* — The Small Patent Law Group LLC; Philip S. Hof

(57) ABSTRACT

A transport trailer includes a chassis, a deck, a lifting assembly, and a stabilizer assembly. The lifting assembly is mechanically coupled to the deck and the chassis and selectively raises and lowers the deck relative to the chassis. The stabilizer assembly includes a support post and a slide member. The support post is laterally disposed between first and second edges of the deck and extends from the chassis to a top end of the support post. The slide member is coupled to the deck and translates along a length of the support post as the deck is raised and lowered to stabilize the deck. An upper surface of the deck is above the top end of the support post when the deck is in a raised position and is below the top end of the support post when the deck is in a lowered position.

20 Claims, 5 Drawing Sheets

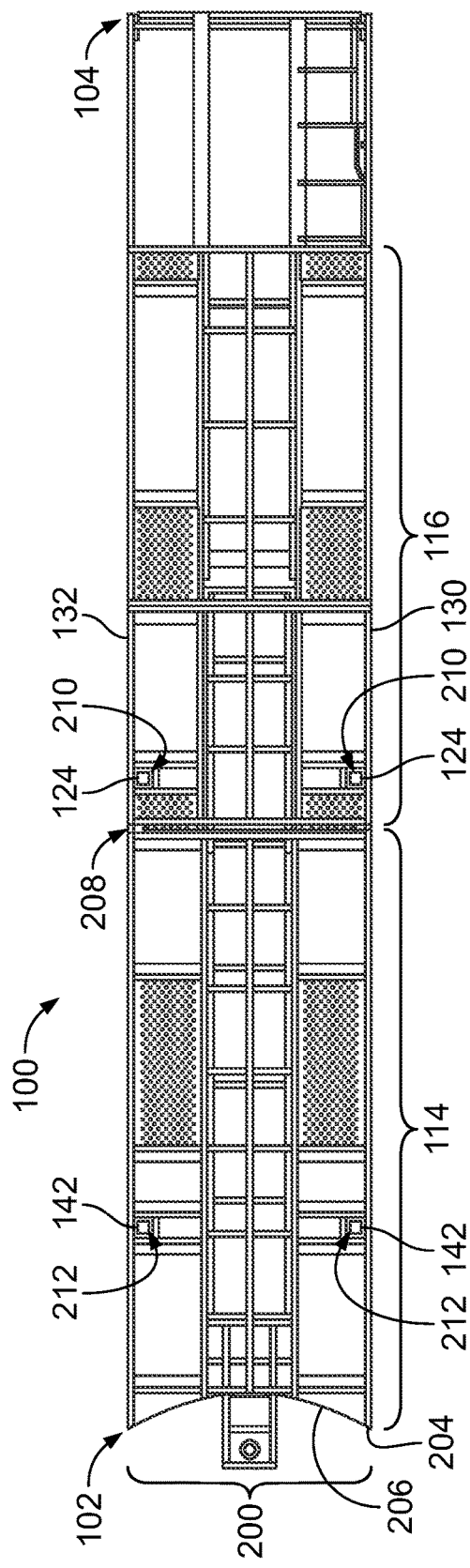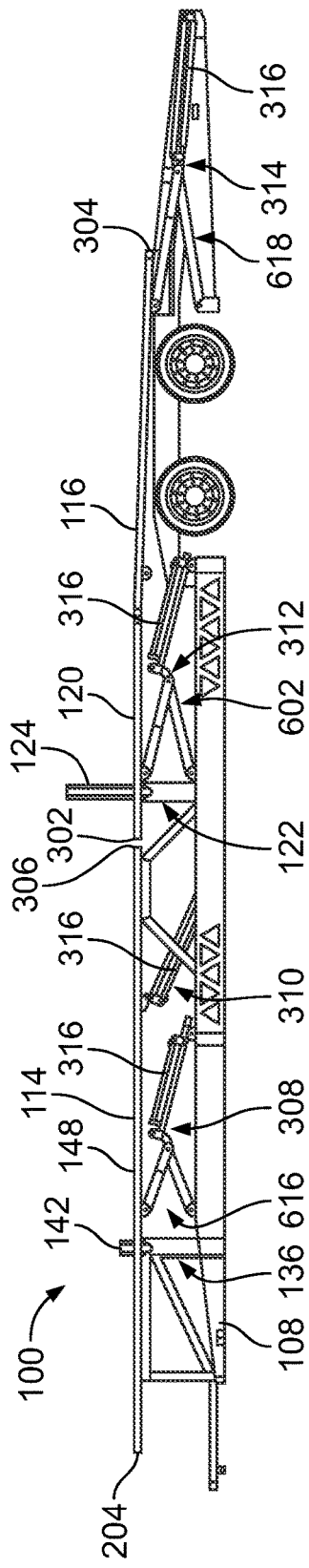

MULTI-VEHICLE TRANSPORT TRAILER

FIELD

The subject matter herein relates to trailers that are designed to carry multiple vehicles as cargo.

BACKGROUND

Some multi-vehicle transport trailers include at least one lifted deck or platform to enable transporting vehicles in a double-decked arrangement such that at least one vehicle is disposed above another vehicle. Known multi-vehicle transport trailers that are permitted to travel on the highway without special designation (e.g., wide load) are generally unable to haul more than one heavy duty vehicle due to the large weight and/or broad width of heavy-duty vehicles. Heavy duty vehicles may include to pickup trucks that have four wheels on the rear axis (e.g., commonly referred to as a dually), campers such as recreation vehicles (RVs), and/or the like. One difficulty associated with transporting heavy-duty vehicles is the weight. Dually pickup trucks can weigh in excess of 7,000 pounds (lbs). When a heavy-duty vehicle is loaded onto a lifted deck, the significant weight on the deck may strain and buckle the support structure, especially when submitted to forces attributable to wind and acceleration while traveling. For example, even if hydraulic lifts can support the weight of the heavy-duty vehicles on the raised decks, rotational forces and torsional forces exerted on the support structure may damage or even break the support structure.

The transport of heavy-duty vehicles on raised decks of trailers requires structural reinforcements to stabilize the decks in the raised state when supporting the heavy-duty vehicles, to avoid risking damage to the trailer. The heavy-duty vehicles may have broad widths that are almost as wide as the trailer itself, as wide as the trailer, or wider than the trailer. For example, dually pickup trucks may have widths of 8 feet (96 inches) or more. The broad widths of the heavy-duty vehicles combined with the significant weight limit the ability to transport heavy duty vehicles on a multi-vehicle transport trailers because the heavy-duty vehicles cannot pass beyond the structural reinforcements that are used to stabilize the liftable decks. For example, due to a constraint on the maximum width of the trailer, there may not be sufficient clearance between the width of the heavy-duty vehicle onboard and the edges or sides of the trailer in which to mount structural reinforcements for the liftable deck. As a result, the structural reinforcements extend into the travel path of a heavy-duty vehicle. Known multi-vehicle transport trailers may be limited to carrying a single heavy-duty vehicle on a lifted deck by positioning the heavy-duty vehicle rearward of the structural reinforcements which essentially block further advancement of the heavy-duty vehicle towards the front of the trailer.

A need remains for a multi-vehicle transport trailer that is designed to accommodate and reliably carry multiple heavy-duty vehicles at the same time.

SUMMARY

In one or more embodiments, a transport trailer is provided that includes a chassis, a deck, a lifting assembly, and a stabilizer assembly. The deck has a width extending from a first edge of the deck to a second edge of the deck. The lifting assembly is mechanically coupled to the deck and the chassis and is configured to selectively raise and lower the deck relative to the chassis. The stabilizer assembly includes a support post and a slide member. The support post is laterally disposed between the first and second edges of the deck and extends from the chassis to a top end of the support post. The slide member is coupled to the deck and is configured to translate along a length of the support post as the deck is raised and lowered to stabilize the deck. An upper surface of the deck is above the top end of the support post when the deck is in a raised position and is below the top end of the support post when the deck is in a lowered position.

In one or more embodiments, a transport trailer is provided that includes a chassis, a deck, a lifting assembly, and a stabilizer assembly. The lifting assembly includes a linear actuator and a scissor linkage and is configured to selectively raise and lower the deck relative to the chassis. The scissor linkage includes at least a first link member and a second link member coupled to each other and to the linear actuator at a pivot joint. An end of the first link member opposite the pivot joint is coupled to the chassis, and an end of the second link member opposite the pivot joint is coupled to the deck. The stabilizer assembly includes a support post and a slide member. The support post extends from the chassis to a top end of the support post. The slide member is coupled to the deck and is configured to translate along a length of the support post as the deck is raised and lowered to stabilize the deck.

In one or more embodiments, a transport trailer is provided that includes a chassis, a front deck, a rear deck, a front deck lifting assembly, a front deck stabilizer assembly, a rear deck lifting assembly, and a rear deck stabilizer assembly. The rear deck is disposed rearward of the front deck along a length of the chassis. The front deck lifting assembly is mechanically coupled to the front deck and the chassis, and is configured to selectively raise and lower the front deck relative to the chassis. The front deck stabilizer assembly includes a support post and a slide member. The support post extends from the chassis to a top end of the support post. The slide member is coupled to the front deck and is configured to translate along a length of the support post as the front deck is raised and lowered to stabilize the front deck. An upper surface of the front deck is above the top end of the support post when the front deck is in a raised position and is below the top end of the support post when the front deck is in a lowered position. The rear deck lifting assembly is mechanically coupled to the rear deck and the chassis, and is configured to selectively raise and lower the rear deck relative to the chassis. The rear deck stabilizer assembly includes a support post and a slide member. The support post extends from the chassis to a top end of the support post. The slide member is coupled to the rear deck and is configured to translate along a length of the support post as the rear deck is raised and lowered to stabilize the rear deck. An upper surface of the rear deck is above the top end of the support post when the rear deck is in a raised position and is below the top end of the support post when the rear deck is in a lowered position. When the rear deck is in the raised position, a vehicle on the upper surface of the rear deck can traverse over the top end of the support post of the rear deck stabilizer assembly onto the front deck.

BRIEF DESCRIPTION OF THE DRAWINGS

FIG. 2 is a top down plan view of the multi-vehicle transport trailer.

FIG. 3 is an side elevation view of the multi-vehicle transport trailer.

DETAILED DESCRIPTION

Figure 1:
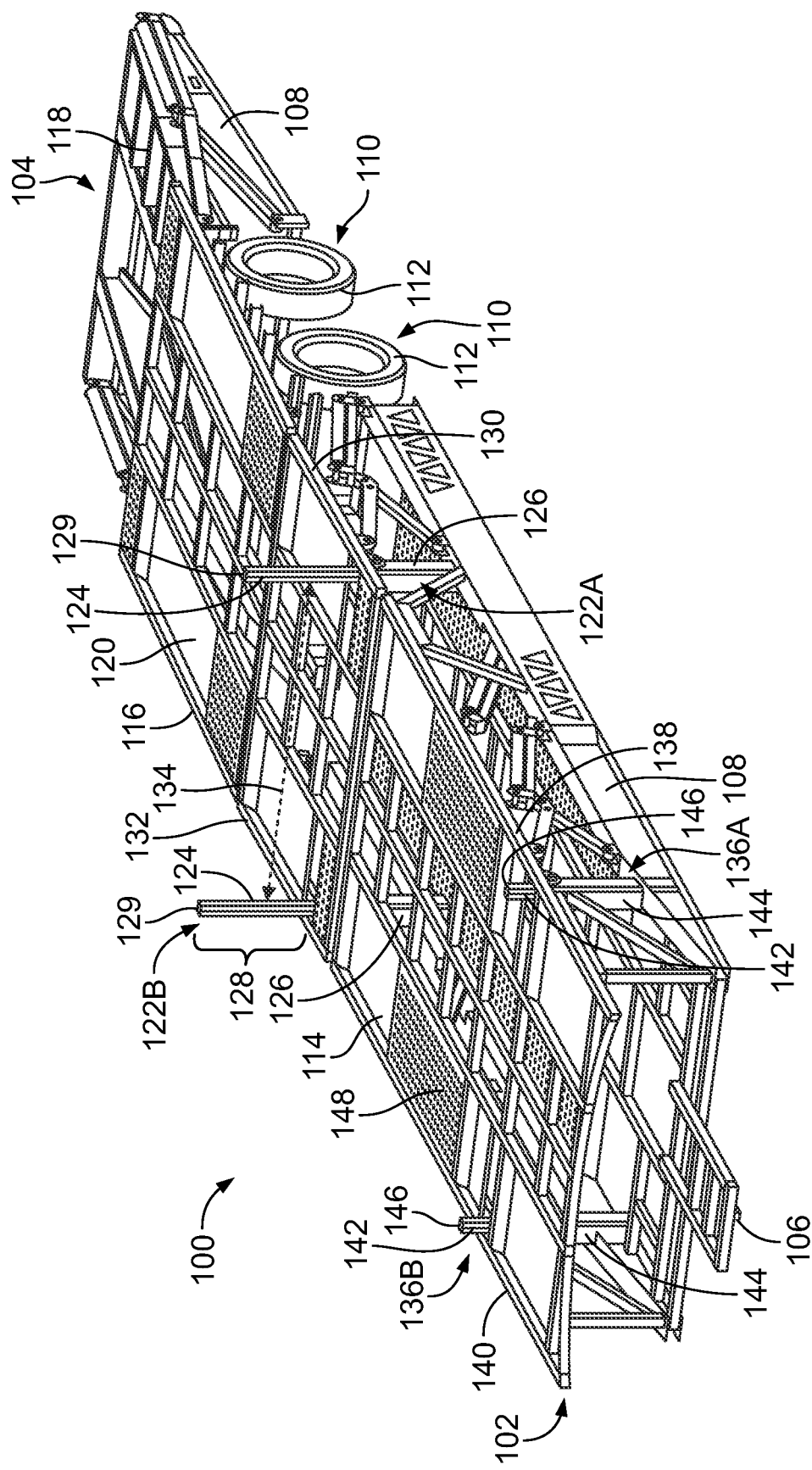
FIG. 1 is a perspective view of a multi-vehicle transport trailer according to an embodiment.

Embodiments of the inventive subject matter describe a multi-vehicle transport trailer capable of carrying multiple heavy-duty vehicles as cargo. The transport trailer includes a chassis and at least one deck that is configured to raise and lower relative to the chassis, via a lifting assembly. The deck is able to accommodate a heavy-duty vehicle on an upper surface of the deck. The heavy-duty vehicle may be a dually pickup truck that has four wheels on a rear axle, an RV, a camper trailer, a large cargo van, or the like.

To stabilize the deck when suspended by the lifting assembly above the chassis in a lifted position while supporting the weight of a heavy-duty vehicle, the transport trailer includes a stabilizer assembly. The stabilizer assembly includes a support post and a slide member. The support post is secured to the chassis and extends from the chassis to a top end of the support post. The slide member is coupled to the deck and movably connected to the support post. For example, as the deck is raised or lowered by the lifting assembly, the slide member moves with the deck and translates along a length of the support post. The interaction between the slide member and the support post stabilizes the deck by restraining rotation, twisting (e.g., torsion), tilt or lean, and the like. The transport trailer may include multiple stabilizer assemblies coupled to the same deck, such as one stabilizer assembly proximate to a left edge of the deck and another stabilizer assembly proximate to a right edge of the deck.

In one or more embodiments, to provide sufficient mechanical support for stabilizing the deck, the support post of the stabilizer assembly may be a rigid beam. The support post extends a height that is taller than the upper surface of the deck when the deck is in a retracted or lowered position relative to the chassis. In an embodiment, the transport trailer is constructed with a width that may be the approximately the same as one or more heavy-duty vehicles used as cargo, which enables the transport trailer to travel in conventional traffic lanes. Since there is insufficient space for mounting the stabilizer assembly laterally outside of the width of the heavy-duty vehicle, the stabilizer assembly is mounted in a location that is within the lateral width of the deck. For example, the support post of the stabilizer assembly may project through an aperture in the deck, at least when the deck is in the lowered position. The support post is located within a pathway for the heavy-duty vehicle defined along the deck, such that the support post blocks advancement of the heavy-duty vehicle when the deck is in the lowered position. In an embodiment, when the deck is lifted by the lifting assembly to the raised position, the upper surface of the deck clears the top end of the support post, which enables the heavy-duty vehicle on the deck to traverse above the top end of the support post onto another platform. The other platform may be a front deck of the transport trailer or a deck on the propulsion-generating vehicle that pulls the transport trailer. In one or more embodiments, the transport trailer enables heavy-duty vehicles to pass beyond the stabilizer assembly that would otherwise block advancement of the heavy-duty vehicles by lifting the heavy-duty vehicles higher than the top end of the support post.

A technical effect of the multi-vehicle transport trailer described herein includes increased transportation efficiency because the transport trailer can carry more heavy-duty vehicles per transport load than known multi-vehicle transport trailers, without sacrificing safety or risk of damage to the trailer. For example, even when multiple heavy-duty vehicles are concurrently supported on lifted decks of the trailer, the decks are reliably stabilized by the stabilizer assemblies. The multi-vehicle transport trailer described herein is designed to concurrently carry at least two heavy-duty vehicles, and may also enable at least one heavy-duty vehicle to be carried on the propulsion-generating vehicle that pulls the trailer. The multi-vehicle transport trailer may also enable at least one heavy-duty vehicle to be transported on the chassis below the deck, rearward of the support post of the stabilizer assembly. In sum, the transport trailer may carry at least three heavy-duty vehicles onboard, such as at least three vehicles that are too wide to pass the support post of the stabilizer assembly when level with the support post. The transport trailer may be able to carry additional vehicles, such as one or more non-heavy-duty vehicles that can pass the support post when level with the support post.

FIG. 1 is a perspective view of a multi-vehicle transport trailer 100 according to an embodiment. The multi-vehicle transport trailer 100 (also referred to herein as transport trailer and simply as trailer) includes a front end 102 and a rear end 104. A coupler 106 is located at the front end 102 for removably connecting the trailer 100 to a propulsion-generating vehicle which pulls the trailer 100 along a route. The trailer 100 has a chassis 108 or main body and multiple wheelsets 110 mounted to the chassis 108. Each wheelset 110 includes an axle and at least two wheels 112 mounted on the respective axle. The trailer 100 has at least one deck movable coupled to the chassis 108. In the illustrated embodiment, the trailer 100 has a front deck 114 and a rear deck 116. The front deck 114 is disposed between the front end 102 of the trailer 100 and the rear deck 116. Vehicles that represent cargo for the trailer 100 can be loaded onto the decks 114, 116 from the rear end 104. For example, the section of the chassis 108 rearward of the wheelsets 110 slopes to define a ramp surface 118. The vehicles can be driven onto the ramp surface 118 in a forward direction (towards the front end 102) onto an upper surface 120 of the rear deck 116.

The front and rear decks 114, 116 are independently liftable relative to the chassis 108. Both decks 114, 116 are in respective lowered positions in FIG. 1. The decks 114, 116 may be positioned in the lowered positions to load vehicles onto the decks 114, 116 and unload vehicles from the decks 114, 116. Each deck 114, 116 can be lifted upward to a respective raised position that is suspended above the chassis 108. The trailer 100 includes at least one stabilizer assembly 122 for stabilizing the rear deck 116 when the rear deck 116 is in the raised position. Components of the stabilizer assembly 122 visible in FIG. 1 include a support post 124 and an outer sleeve 126 or cover that surrounds the support post 124 along a length of the support post 124. As shown in FIG. 1, the outer sleeve 126 is disposed below the upper surface 120 of the rear deck 116. The support post 124 extends from the chassis 108 to a top end 129 of the support post 124. The top end 129 is disposed above the upper surface 120 of the rear deck 116 when the rear deck 116 is in the lowered position. An exposed section 128 of the support post 124 projects beyond the outer sleeve 126 to the top end 129, and at least a portion of the exposed section 128 projects beyond the upper surface 120 of the rear deck 116.

In the illustrated embodiment, the trailer 100 includes two stabilizer assemblies 122 for stabilizing the rear deck 116. The two stabilizer assemblies 122 include a first stabilizer assembly 122A and a second stabilizer assembly 122B. The components of the first stabilizer assembly 122A may be replicas or copies of the components of the second stabilizer assembly 122B. The first stabilizer assembly 122A is located at or proximate to a first edge 130 of the rear deck 116. The second stabilizer assembly 122B is located at or proximate to a second edge 132 of the rear deck 116. The first and second edges 130, 132 are opposite one another and a distance between the edges 130, 132 defines a lateral width of the rear deck 116. As used herein, the first edge 130 is referred to as a left edge 130, the second edge 132 is referred to as a right edge 132, the first stabilizer assembly 122A is referred to as a left stabilizer assembly 122A, and the second stabilizer assembly 122B is referred to as a right stabilizer assembly 122B. In an embodiment, the support post 124 of the left stabilizer assembly 122A is laterally interior of the left edge 130, such that the support post 124 is disposed between the left edge 130 and a lateral centerline that extends the length of the trailer 100 and bisects the trailer 100. The support post 124 of the right stabilizer assembly 122B may be laterally interior of the right edge 132.

The left and right stabilizer assemblies 122A, 122B may be located at approximately the same longitudinal position along the length of the trailer 100 between the front and rear ends 102, 104. The support posts 124 of the stabilizer assemblies 122A, 122B are located across from one another. The exposed sections 128 of the support post 124 that project above the rear deck 116 may resemble goal posts or fence posts. A distance 134 between the support post 124 of the left stabilizer assembly 122A and the support post 124 of the right stabilizer assembly 122B may be less than the width of the rear deck 116 from the left edge 130 to the right edge 132. In an embodiment, the distance between the support posts 124 of the left and right stabilizer assemblies 122A, 122B may be narrower than a width of one or more vehicles carried by the trailer as cargo, such as heavy-duty vehicles. In a non-limiting example, the distance between the support posts 124 may be no greater than 8 feet (96 inches). Vehicles that are wider than 8 feet, at least along the wheels and fenders, are too wide to traverse between the support posts 124 to move from the rear deck 116 to the front deck 114. Furthermore, the height of the support posts 124 projecting above the rear deck 116 may be too tall for vehicles to simply drive over the support posts 124 when the rear deck 116 is in the lowered position as shown in FIG. 1. For example, the support posts 124 may project a height beyond the upper surface 120 of the rear deck 116 that is taller than the ground clearance height of a vehicle loaded on the rear deck 116, such that even if the wheels of the vehicle could avoid support posts 124, the support posts 124 would still block advancement of the vehicle to the front deck 114.

In an embodiment, the left and right stabilizer assemblies 122A, 122B stabilize the rear deck 116 (and are also referred to herein as rear stabilizer assemblies), and the trailer 100 also includes at least one stabilizer assembly 136 for stabilizing the front deck 114 when raised (referred to herein as at least one front stabilizer assembly). In the illustrated embodiment, the trailer 100 includes a first, or left, stabilizer assembly 136A and a second, or right, stabilizer assembly 136B. The left stabilizer assembly 136A is at or proximate to a left edge 138 of the front deck 114, and the right stabilizer assembly 136B is at or proximate to a right edge 140 of the front deck 114. The left stabilizer assembly 136A may be aligned with the left stabilizer assembly 122A of the rear deck 116. The right stabilizer assembly 136B may be aligned with the right stabilizer assembly 122B of the rear deck 116. The left and right stabilizer assemblies 136A, 136B may be similar to the stabilizer assemblies 122A, 122B with respect to components and functionality. For example, each of the stabilizer assemblies 136A, 136B includes a respective support post 142 that projects out of a respective outer sleeve 144 or cover. A top end 146 of each support post 142 may project above an upper surface 148 of the front deck 114 when the front deck 114 is in the lowered position. In the illustrated embodiment, the support posts 142 do not extend as far above the front deck 114 as the support posts 124 of the stabilizer assemblies 122A, 122B extend above the rear deck 116. In an alternative embodiment, the support posts 142 may extend at least as far above the front deck 114 as the support posts 124 extend above the rear deck 116. In an embodiment, the support posts 124, 142 of both the rear and front stabilizer assemblies 122, 136 are rigidly fixed to the chassis 108 and have a fixed length. For example, the top ends 129, 146 of the support posts 124, 142 do not move up or down relative to the chassis 108.

FIG. 2 is a top down plan view of the multi-vehicle transport trailer 100 according to the embodiment shown in FIG. 1. The trailer 100 is designed to accommodate vehicles that have relatively wide bodies as cargo, and such vehicles are generically referred to herein as heavy-duty vehicles. The heavy-duty vehicles may include dually pickup trucks, RVs, camper trailers, large vans, and the like. The trailer 100 defines a pathway that can be occupied by the heavy-duty vehicles. The pathway extends from the rear end 104 to the front end 102 along both the rear and front decks 116, 114. The front deck 114 is spaced apart from the rear deck 116 by a gap 208. The gap 208 may be less than one foot, such as less than six inches to enable the wheels of the heavy-duty vehicles to traverse the gap 208 without damaging the wheels or the vehicles. The pathway is essentially the same width as the width 200 of the trailer 100 itself, such that the heavy-duty vehicles onboard the trailer 100 may be as wide as the trailer 100. The trailer 100 may provide at least 60 feet of usable deck space, such as at least 65 feet of usable deck space. In the illustrated embodiment, a front 204 of the front deck 114 has a concave curve 206. The concave curve 206 may be sized to accommodate a convex curve along a rear platform of the propulsion-generating vehicle that pulls the trailer 100, such that a gap between the rear platform and the front deck 114 may be relatively uniform regardless of the turning orientation of the propulsion-generating vehicle. The propulsion-generating vehicle may be a tractor truck or the like.

In an embodiment, the rear deck 116 defines an aperture 210 that is sized and positioned to receive each support post 124 of the stabilizer assemblies 122A, 122B (shown in FIG. 1). For example, the rear deck 116 defines two apertures 210 in FIG. 2. Each aperture 210 is sized and positioned to enable the associated support post 124 to pass through the aperture 210 without physically contacting the rear deck 116. The apertures 210 are proximate to, but spaced apart from the left and right edges 130, 132. The front deck 114 similarly defines two apertures 212 sized and positioned to enable the support posts 142 of the stabilizer assemblies 136A, 136B (shown in FIG. 1) to pass through the apertures 212 without physically contacting the front deck 114.

FIG. 3 is an side elevation view of the multi-vehicle transport trailer 100. When the front and rear decks 114, 116 are in the lowered positions, the support posts 124, 142 project above the respective upper surfaces 148, 120 of the decks 114, 116 to block advancement of the heavy-duty vehicles disposed on the decks 114, 116. In the illustrated embodiment, the stabilizer assembly 122 for the rear deck 116 is located closer to a front 302 of the rear deck 116 than to a rear 304 of the rear deck 116. For example, the stabilizer assembly 122 may be within 6 feet of the front 302. Furthermore, the stabilizer assembly 136 for the front deck 114 may be located closer to the front 204 of the front deck 114 than to a rear 306 of the front deck 114. For example, the stabilizer assembly 136 may be within 15 feet of the front 204. Optionally, the proximity distance of the stabilizer assembly 122 to the front 302 of the rear deck 116 may be shorter than the distance of the stabilizer assembly 136 to the front 204 of the front deck 114.

The trailer 100 includes lifting assemblies for selectively raising and lowering the front and rear decks 114, 116 relative to the chassis 108. Each lifting assembly is mechanically coupled to the chassis 108 and either the front deck 114 or the rear deck 116. The lifting assemblies may be independently controlled to move the decks 114, 116 relative to each other. In the illustrated embodiment, the lifting assemblies include at least one primary front deck lifting assembly 308, at least one secondary front deck lifting assembly 310, at least one primary rear deck lifting assembly 312, and at least one secondary rear deck lifting assembly 314. The primary and secondary front deck lifting assemblies 308, 310 are coupled to the front deck 114 at spaced apart locations. The primary and secondary rear deck lifting assemblies 312, 314 are coupled to the rear deck 116 at spaced apart locations. Although not shown in FIG. 3, the trailer 100 includes left and right variants of each of the lifting assemblies 308, 310, 312, 314. In the illustrated embodiment, the primary front deck lifting assembly 308 is located proximate to the stabilizer assembly 136 for the front deck 114, and the primary rear deck lifting assembly 312 is located proximate to the stabilizer assembly 122 for the rear deck 116. The secondary front deck lifting assembly 310 is located between the primary front deck lifting assembly 308 and the primary rear deck lifting assembly 312 along a length of the trailer 100. The primary rear deck lifting assembly 312 is located between the secondary front deck lifting assembly 310 and the secondary rear deck lifting assembly 314 along the length of the trailer 100.

Each of the lifting assemblies 308, 310, 312, 314 includes a linear actuator 316. The linear actuators 316 may be hydraulic, electric, or the like. In a non-limiting example, the linear actuators 316 are hydraulic actuators that include a piston held within and translatable relative to a cylinder. The extension of the actuator 316 is controlled by hydraulic fluid pressure within the cylinder that forces the piston in a direction away from the cylinder. The rear deck 116 is raised by increasing the hydraulic fluid pressure within the cylinders of the linear actuators 316 of the rear deck lifting assemblies 312, 314. The front deck 114 is similarly raised and lowered by adjusting the pressure in the cylinders of the linear actuators 316 of the front deck lifting assemblies 308, 312. In an embodiment, the stabilizer assemblies 122, 136 do not include actuators and are not actively powered.

The trailer 100 may be loaded according to the following example loading sequence. With the rear deck 116 in the lowered position shown in FIGS. 1 and 3, a first heavy-duty vehicle may be driven up a ramp onto the ramp surface 118 of the chassis 108 before driving onto the upper surface 120 of the rear deck 116. Once the heavy-duty vehicle is fully loaded onto the rear deck 116, the rear deck lifting assemblies 312, 314 may be controlled to raise the rear deck 116.

Figure 4:
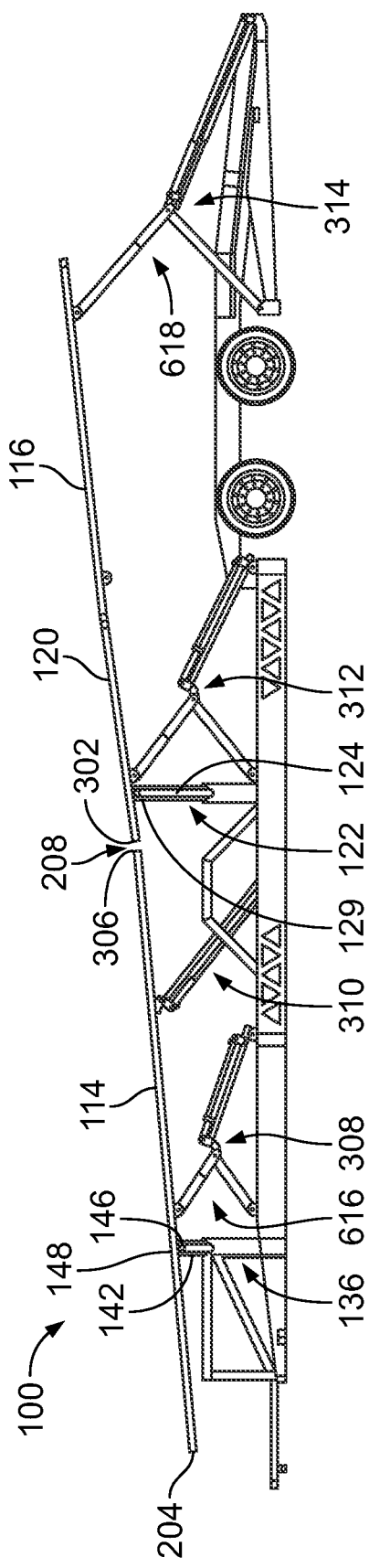
FIG. 4 is a side elevation view of the multi-vehicle transport trailer with a rear deck in a raised position and a front deck in a partially raised position.

FIG. 4 is a side elevation view of the multi-vehicle transport trailer 100 with the rear deck 116 in the raised position and the front deck 114 in a partially raised position. With continued reference to the example loading sequence, the rear deck lifting assemblies 312, 314 may raise the rear deck 116, with the heavy-duty vehicle thereon, to the raised position shown in FIG. 4. The raised position in FIG. 4 may represent a fully raised or maximum height position of the rear deck 116. In the raised position, the upper surface 120 of the rear deck 116 is above the top end 129 of the support post 124 of the stabilizer assembly 122, so the support post 124 no longer impedes advancement of the heavy-duty vehicle towards the front.

Before the heavy-duty vehicle is advanced, the front deck 114 is raised from the lowered position to the partially raised position shown in FIG. 4. In the partially raised position, the rear 306 of the front deck 114 is approximately level with the front 302 of the rear deck 116 to provide a smooth transition for the heavy-duty vehicle from the rear deck 116 to the front deck 114. The heavy-duty vehicle is then moved to traverse over the top end 129 of the support post 124, across the gap 208, and onto the front deck 114.

In the partially raised position, the upper surface 148 of the front deck 114 is above the top end 146 of the support post 142 of the stabilizer assembly 136, so the support post 142 no longer impedes advancement of the heavy-duty vehicle towards the front. The next step in the loading sequence for the heavy-duty vehicle may depend on a trip plan, such as the number of vehicles to be carried by the vehicle system on a scheduled trip. One option is for the front deck lifting assemblies 308, 310 to be controlled to adjust the height and orientation of the front deck 114 to enable the front 204 of the front deck 114 to be level with a platform on the propulsion-generating vehicle that pulls the trailer 100, as long as the front deck 114 remains above the support post 142. Once achieved, the heavy-duty vehicle can be advanced from the front deck 114 onto the propulsion-generating vehicle. Another option is for the heavy-duty vehicle to remain on the front deck 114 without advancing farther.

Once the rear deck 116 is unoccupied again, the rear deck lifting assemblies 312, 314 may be controlled to lower the rear deck 116 back to the lowered position shown in FIG. 3. Another heavy-duty vehicle can be driven onto the rear deck 116, then the rear deck lifting assemblies 312, 314 may lift the rear deck 116 to the raised position again to clear the support post 124, as shown in FIG. 4. If the front deck 114 is unoccupied because the first heavy-duty vehicle has been advanced onto the propulsion-generating vehicle, the front deck 114 can be raised, lowered, and/or tilted by the front deck lifting assemblies 308, 310 to achieve the partially raised position shown in FIG. 4. The second heavy-duty vehicle can be advanced from the rear deck 116 onto the front deck 114. This process can repeat until the front and rear decks 114, 116 are both occupied by vehicles. Once both decks 114, 116 are loaded, the lifting assemblies 308, 310, 312, 314 may lift the decks 114, 116 to the raised positions.

Figure 5:
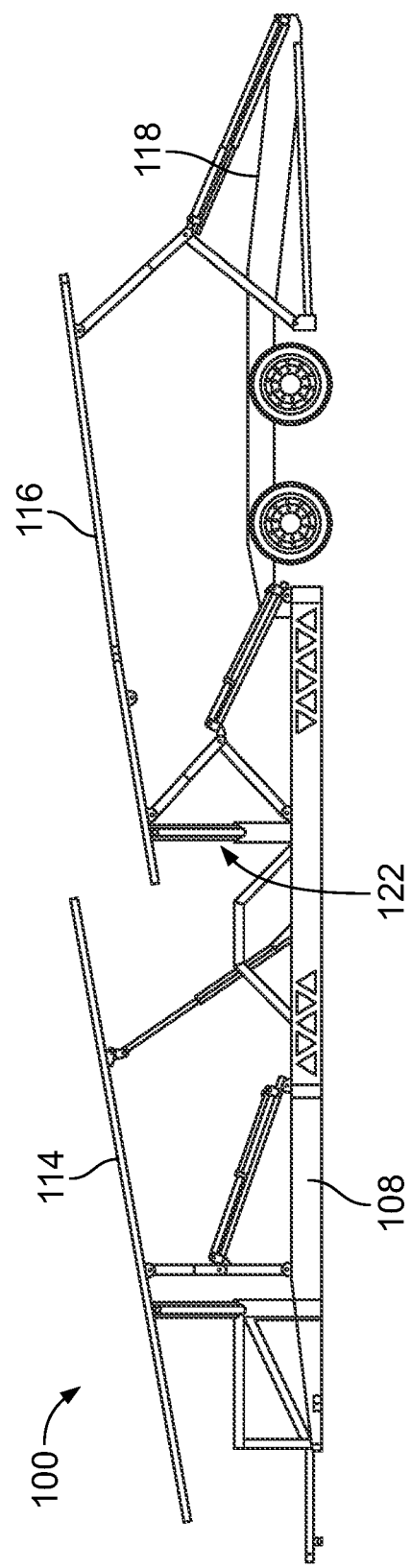
FIG. 5 is a side elevation view of a majority of the multi-vehicle transport trailer with the front deck and the rear deck in raised positions.

FIG. 5 is a side elevation view of a majority of the multi-vehicle transport trailer 100 with the front deck 114 and the rear deck 116 in raised positions. The arrangement differs from the arrangement in FIG. 4 because the front deck 114 is lifted higher (and tilted more) in the raised position shown in FIG. 5 than in the partially raised position shown in FIG. 4. Although not shown, both the front deck 114 and the rear deck 116 may be supporting heavy-duty vehicles when in the raised positions. After the decks 114, 116 are loaded, the loading sequence may include loading one or more vehicles into the belly of the trailer 100 underneath the decks 114, 116. For example, multiple vehicles may be driven one at a time onto the ramp surface 118 of the chassis 108 and then advanced along platforms on the chassis 108 towards the front of the trailer 100. At least one of the vehicles loaded below the decks 114, 116 may be a heavy-duty vehicle that is too wide to fit between the rear deck stabilizer assemblies 122. For example, at least one smaller vehicle that can pass between the rear deck stabilizer assemblies 122 is loaded first to occupy the space under the front deck 114, and then at least one heavy-duty vehicle can be loaded to occupy the space under the rear deck 116 rearward of the stabilizer assemblies 122. Using this loading sequence, the trailer 100 alone can carry at least three heavy-duty vehicles. Additional heavy-duty vehicles can be carried if the propulsion-generating vehicle has the ability to accommodate heavy-duty vehicles received from the front deck 114.

Figure 6:
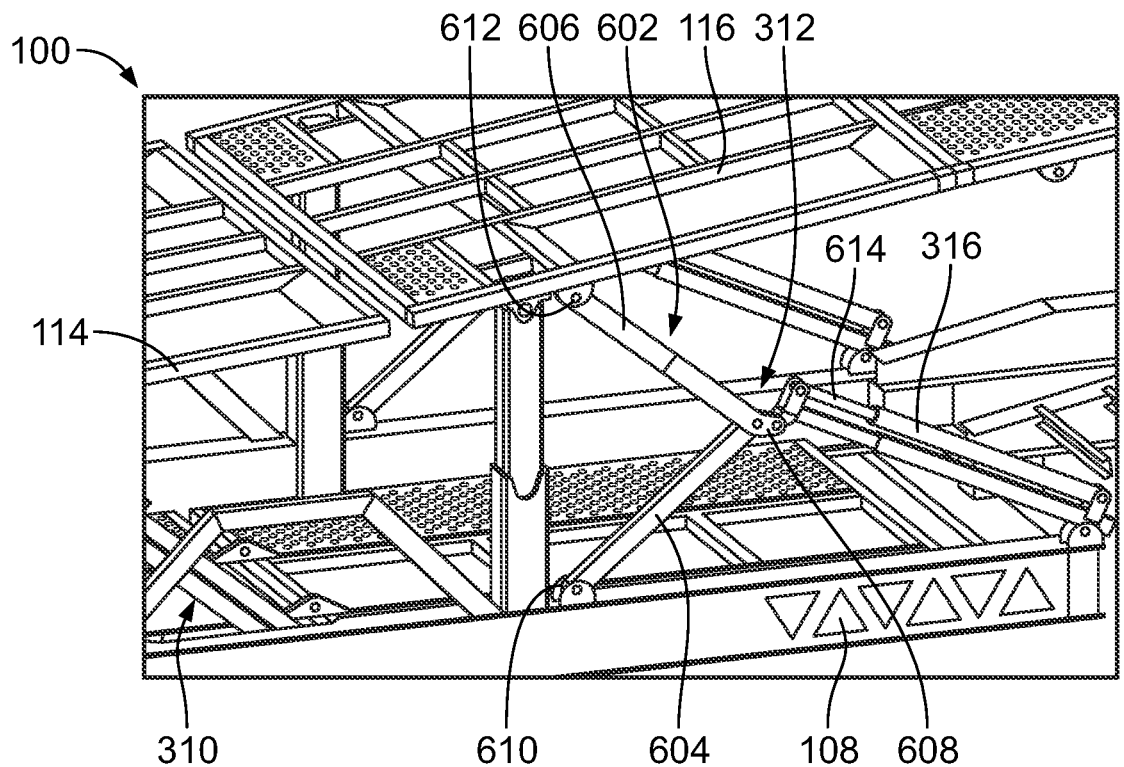
FIG. 6 is an enlarged perspective view of a portion of the multi-vehicle transport trailer with the rear deck in the raised position.

FIG. 6 is an enlarged perspective view of a portion of the multi-vehicle transport trailer 100 with the rear deck 116 in the raised position. In an embodiment, the primary rear deck lifting assembly 312 includes the linear actuator 316 and a scissor linkage 602 that is mechanically connected to the linear actuator 316. The scissor linkage 602 includes a first link member 604 and a second link member 606 coupled to each other at a pivot joint 608 or hinge. The link members 604, 606 may be elongated arms or beams. One end of the linear actuator 316 is fixed to the chassis 108 at a pivot joint, and an opposite end of the linear actuator 316 is coupled to the link members 604, 606 at the pivot joint 608. An end 610 of the first link member 604 opposite the pivot joint 608 is coupled to the chassis 108 at a location spaced apart from the end of the linear actuator 316 that is fixed to the chassis 108. The end 610 is pivotable relative to the chassis 108 via a pivot joint. An end 612 of the second link member 606 opposite the pivot joint 608 is coupled to the rear deck 116, and is pivotable relative to the deck 116 via a pivot joint. As a piston 614 of the linear actuator 316 is forced outward by the hydraulic fluid to extend the length of the actuator 316, an angle defined between the first and second link members 604, 606 increases. For example, the first link member 604 rotates about the end 610 coupled to the chassis 108, and the second link member 606 rotates about the end 612 that is coupled to the rear deck 116. The weight of the rear deck 116 is applied on the second link member 606, and gets distributed between the first link member 606 and the linear actuator 316 to the chassis 108.

The scissor linkage 602 may enable using a shorted linear actuator 316 relative to the actuators in conventional multi-vehicle transport trailers which extend the full distance from the chassis to the deck. For example, conventional actuators couple directly to the deck, while the linear actuator 316 of the primary rear deck lifting assembly 312 indirectly couples to the deck 116 via the second link member 606. Furthermore, by connecting each rear deck lifting assembly 312 to the chassis 108 at two different, spaced apart locations and limiting rotation of the components along a single plane, the rear deck lifting assembly 312 may provide enhanced stability for the rear deck 116 relative to stability provided by the conventional actuators that extend from the chassis to the deck.

In an embodiment, the primary front deck lifting assembly 308 and the secondary rear deck lifting assembly 314, shown in FIGS. 3 and 4, include respective scissor linkages 616, 618 similar to the scissor linkage 602 of the primary rear deck lifting assembly 312 shown in FIG. 6. Optionally, the secondary front deck lifting assembly 310 may lack a scissor linkage, such that the actuator 316 extends fully from the chassis 108 to the front deck 114.

Figure 7:
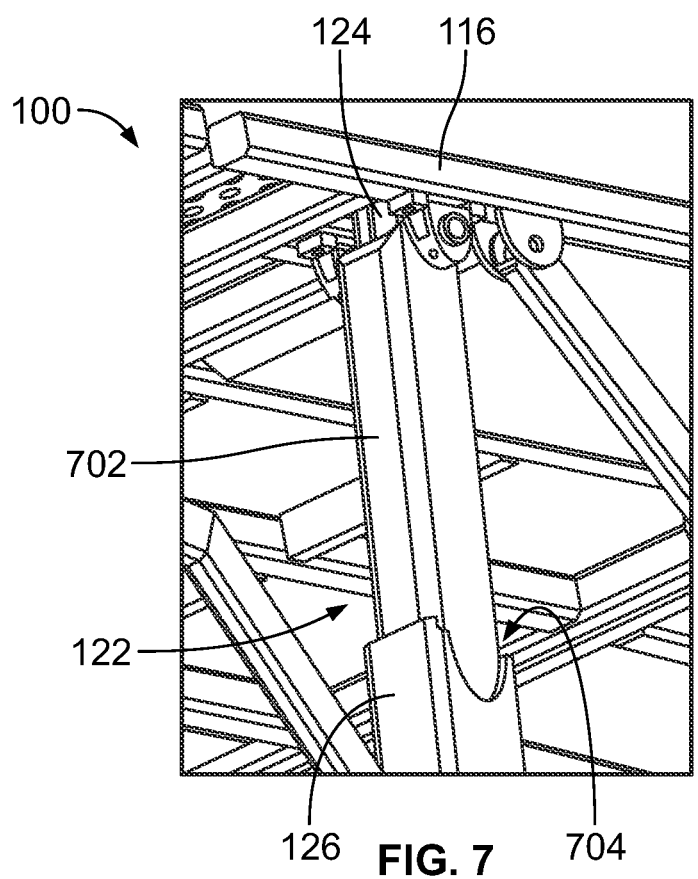
FIG. 7 is an enlarged bottom-up perspective view of a portion of the multi-vehicle transport trailer showing a stabilizer assembly that stabilizes the rear deck.

FIG. 7 is an enlarged perspective view of a portion of the multi-vehicle transport trailer 100 showing the rear stabilizer assembly 122 that stabilizes the rear deck 116. The stabilizer assembly 122 according to an embodiment includes the support post 124, the outer sleeve 126, and a slide member 702. The slide member 702 is mechanically coupled to the rear deck 116 and moves with the rear deck 116 as the rear deck 116 is raised and lowered by the rear deck lifting assemblies 312, 314. The slide member 702 is movably connected to the support post 124 such that the slide member 702 translates along a length of the support post 124 as the rear deck 116 is raised and lowered. The engagement between the slide member 702 and the support post 124 stabilizes the rear deck 116, which is particularly beneficial when the vehicle or vehicles supported by the rear deck 116 are relatively heavy and/or large such that inertia and/or wind drag may urge the rear deck 116 to rotate, tilt, or twist.

The slide member 702 may be disposed radially between the support post 124 and the outer sleeve 126 of the stabilizer assembly 122. For example, a radial gap 704 may be defined between the support post 124 and the outer sleeve 126, and the slide member 702 may be disposed in the radial gap 704. In an embodiment, both the support post 124 and the outer sleeve 126 are fixedly secured, via welding, strong brackets and fasteners, or the like, to the chassis 108, but are not directly connected to the rear deck 116. The slide member 702 is fixedly secured to the rear deck 116, but is not directly connected to the chassis 108, so the slide member 702 can translate relative to the support post 124 and the outer sleeve 126 as the rear deck 116 moves. The slide member 702 may be secured to the rear deck 116 via coupling members, such as bearings and the like.

In an embodiment, the slide member 702 surrounds the support post 124 along at least a majority of a circumference or perimeter of the support post 124. For example, the slide member 702 may be a hollow pipe that surrounds an entirety of the support post 124. In an alternative embodiment, the slide member 702 only surrounds a portion of the support post 124 and interlocks with the support post 124 via rails or the like to retain the translatable connection between the two components.

Figure 8:
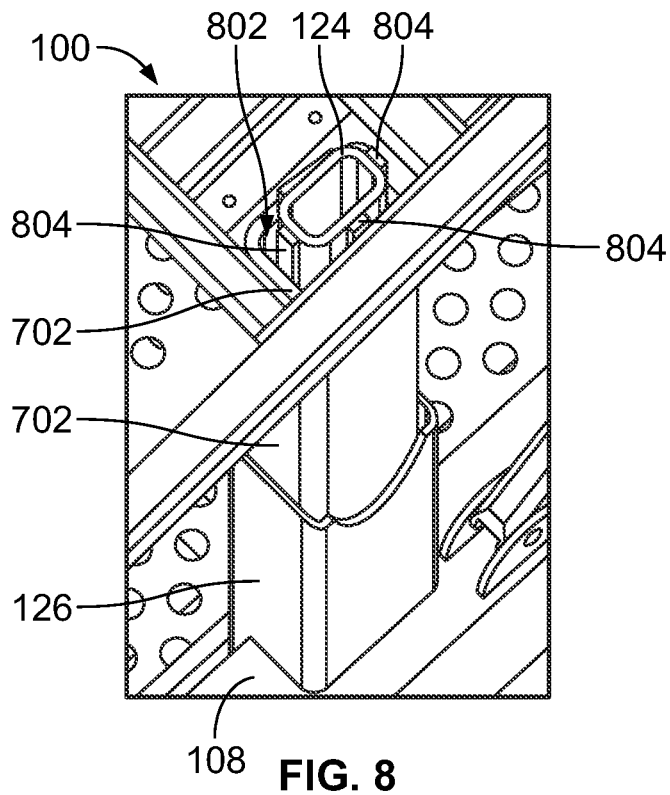
FIG. 8 is an enlarged top-down perspective view of the portion of the multi-vehicle transport trailer shown in FIG. 7.

FIG. 8 is an enlarged top-down perspective view of the portion of the multi-vehicle transport trailer 100 that is shown in FIG. 7. As shown in FIG. 8, the support post 124 may be a hollow pipe that is disposed within the hollow cavity 802 of the slide member 702. Alternatively, the support post 124 may be solid, not hollow. In an embodiment, the support post 124 and the slide member 702 are designed to limit or prevent rotation (or twisting) and tilting of the slide member 702 relative to the support post 124, such that the slide member 702 only has the freedom to move linearly along the length of the support post 124. For example, the support post 124 and the slide member 702 may have rectangular cross-sections which limit relative rotation. Furthermore, one or both of the support post 124 and the slide member 702 may include at least one rail 804 that protrudes from a surface thereof towards the other of the component. The at least one rail 804 is elongated along a length of the slide member 702 or the support post 124 from which the at least one rail 804 protrudes. The rails 804 reduce the clearance space between the two components, which further limits the ability of one component to rotate and/or tilt relative to the other. In the illustrated embodiment, the support post 124 includes multiple rails 804 that extend outward towards the inner surface of the slide member 702 surrounding the support post 124. Optionally, the slide member 702 may include features that are designed to engage and interlock with the rails 804, such as elongated grooves that receive the rails 804 therein, rollers that contact and roll along the rails 804, or the like.

Figure 9:
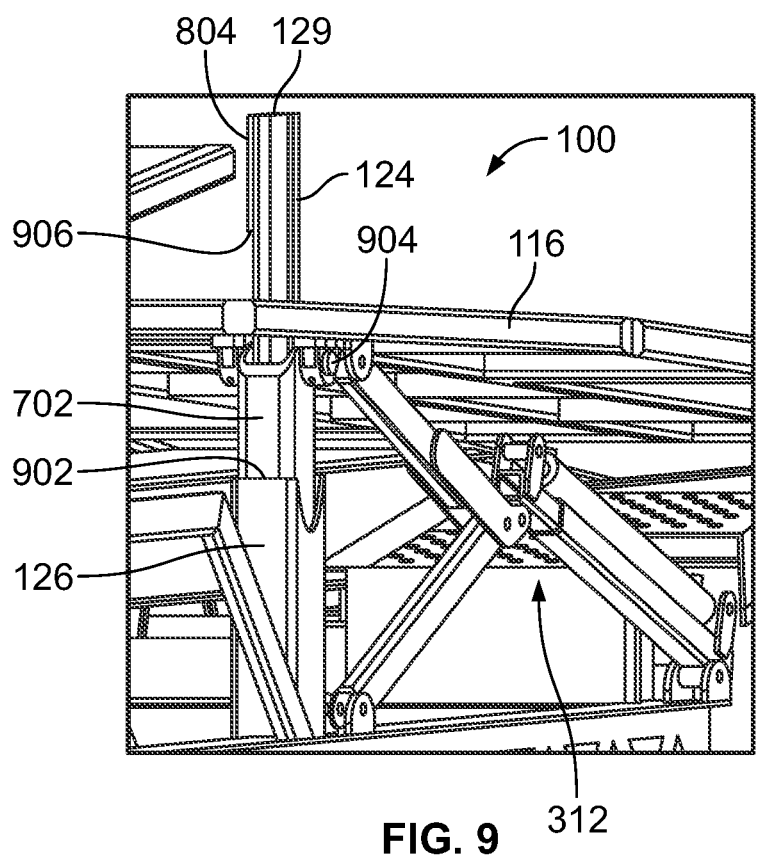
FIG. 9 is an enlarged top-down perspective view of a portion of the multi-vehicle transport trailer with the rear deck in a partially raised position.

FIG. 9 is an enlarged top-down perspective view of a portion of the multi-vehicle transport trailer 100 with the rear deck 116 in a partially raised position. When the rear deck 116 is partially raised to a position between the lowered position and the raised position, a portion of the slide member 702 projects above a top edge 902 of the outer sleeve 126. The support post 124 still projects above the rear deck 116, although the length of the support post 124 that extends above the rear deck 116 is less than when the deck 116 is in the lowered position. As the lifting assembly 312 raises the rear deck 116, the slide member 702 is pulled, via a bearing assembly 904 which couples the slide member 702 to the deck 116, upward along the length of the support post 124 towards the top end 129. The support post 124 and/or slide member 702 may include at least one hard stop surface for providing an upper positional limit of the slide member 702 relative to the support post 124. For example, one of the rails 804 in FIG. 9 has a squared lower end 906 that provides a hard stop surface. The lower end 906 may be designed to abut against a feature along an interior surface of the slide member 702 when the slide member 702 to block further movement of the slide member 702, and the rear deck 116, in the upward direction for safety.

The stabilizer assembly 122 shown in FIGS. 7 through 9 may be similar to the other stabilizer assembly 122 across the width of the trailer 100 and to the stabilizer assemblies 136 that stabilize the front deck 114. For example, the stabilizer assemblies 122, 136 may have similar components that perform the same or similar functions.

In one or more embodiments, a transport trailer includes a chassis, a deck, a lifting assembly, and a stabilizer assembly. The deck has a width extending from a first edge of the deck to a second edge of the deck. The lifting assembly is mechanically coupled to the deck and the chassis and is configured to selectively raise and lower the deck relative to the chassis. The stabilizer assembly includes a support post and a slide member. The support post is laterally disposed between the first and second edges of the deck and extends from the chassis to a top end of the support post. The slide member is coupled to the deck and is configured to translate along a length of the support post as the deck is raised and lowered to stabilize the deck. An upper surface of the deck is above the top end of the support post when the deck is in a raised position and is below the top end of the support post when the deck is in a lowered position.

Optionally, the deck defines an aperture sized and positioned to enable the support post to pass through the aperture without physically contacting the deck.

Optionally, the lifting assembly includes a linear actuator and a scissor linkage. The scissor linkage includes at least a first link member and a second link member coupled to each other and to the linear actuator at a pivot joint. An end of the first link member opposite the pivot joint is coupled to the chassis, and an end of the second link member opposite the pivot joint is coupled to the deck.

Optionally, the slide member surrounds at least a majority of a circumference of the support post. The slide member or the support post includes at least one rail that protrudes from a surface thereof towards the other of the slide member or the support post. The at least one rail is elongated along a length of the slide member or the support post from which the at least one rail protrudes.

Optionally, the slide member is disposed within a radial gap between the support post and an outer sleeve of the stabilizer assembly. The support post and the outer sleeve are both fixedly secured to the chassis.

Optionally, the stabilizer assembly is a first stabilizer assembly located proximate to the first edge of the deck, and the transport trailer further includes a second stabilizer assembly located across from the first stabilizer assembly proximate to the second edge of the deck. A distance between the support post of the first stabilizer assembly and a support post of the second stabilizer assembly may be no greater than eight feet.

Optionally, the deck is a rear deck and the transport trailer further includes a front deck disposed between the rear deck and a coupler configured to mechanically connect to a propulsion-generating vehicle. When the rear deck is in the raised position, a vehicle on the upper surface of the rear deck can traverse over the top end of the support post onto the front deck. Optionally, the lifting assembly is a rear deck lifting assembly and the transport trailer further includes a front deck lifting assembly mechanically coupled to the front deck and the chassis. The front deck lifting assembly is configured to selectively raise and lower the front deck relative to the chassis independently of the rear deck. Optionally, the front deck lifting assembly includes a linear actuator and a scissor linkage. The scissor linkage includes at least a first link member and a second link member coupled to each other and to the linear actuator at a pivot joint. An end of the first link member opposite the pivot joint is coupled to the chassis, and an end of the second link member opposite the pivot joint is coupled to the front deck.

In one or more embodiments, a transport trailer includes a chassis, a deck, a lifting assembly, and a stabilizer assembly. The lifting assembly includes a linear actuator and a scissor linkage and is configured to selectively raise and lower the deck relative to the chassis. The scissor linkage includes at least a first link member and a second link member coupled to each other and to the linear actuator at a pivot joint. An end of the first link member opposite the pivot joint is coupled to the chassis, and an end of the second link member opposite the pivot joint is coupled to the deck. The stabilizer assembly includes a support post and a slide member. The support post extends from the chassis to a top end of the support post. The slide member is coupled to the deck and is configured to translate along a length of the support post as the deck is raised and lowered to stabilize the deck.

Optionally, the deck has a width extending from a first edge of the deck to a second edge of the deck, and the support post is laterally disposed between the first and second edges of the deck.

Optionally, the deck defines an aperture sized and positioned to enable the support post to pass through the aperture without physically contacting the deck.

Optionally, an upper surface of the deck is above the top end of the support post when the deck is in a raised position and is below the top end of the support post when the deck is in a lowered position.

Optionally, the slide member is disposed within a radial gap between the support post and an outer sleeve of the stabilizer assembly. The support post and the outer sleeve are both fixedly secured to the chassis.

Optionally, the stabilizer assembly is a first stabilizer assembly located proximate to a first edge of the deck, and the transport trailer further includes a second stabilizer assembly located across from the first stabilizer assembly proximate to a second edge of the deck. A distance between the support post of the first stabilizer assembly and a support post of the second stabilizer assembly may be no greater than eight feet.

In one or more embodiments, a transport trailer includes a chassis, a front deck, a rear deck, a front deck lifting assembly, a front deck stabilizer assembly, a rear deck lifting assembly, and a rear deck stabilizer assembly. The rear deck is disposed rearward of the front deck along a length of the chassis. The front deck lifting assembly is mechanically coupled to the front deck and the chassis, and is configured to selectively raise and lower the front deck relative to the chassis. The front deck stabilizer assembly includes a support post and a slide member. The support post extends from the chassis to a top end of the support post. The slide member is coupled to the front deck and is configured to translate along a length of the support post as the front deck is raised and lowered to stabilize the front deck. An upper surface of the front deck is above the top end of the support post when the front deck is in a raised position and is below the top end of the support post when the front deck is in a lowered position. The rear deck lifting assembly is mechanically coupled to the rear deck and the chassis, and is configured to selectively raise and lower the rear deck relative to the chassis. The rear deck stabilizer assembly includes a support post and a slide member. The support post extends from the chassis to a top end of the support post. The slide member is coupled to the rear deck and is configured to translate along a length of the support post as the rear deck is raised and lowered to stabilize the rear deck. An upper surface of the rear deck is above the top end of the support post when the rear deck is in a raised position and is below the top end of the support post when the rear deck is in a lowered position. When the rear deck is in the raised position, a vehicle on the upper surface of the rear deck can traverse over the top end of the support post of the rear deck stabilizer assembly onto the front deck.

Optionally, each of the front deck lifting assembly and the rear deck lifting assembly includes a linear actuator and a scissor linkage.

Optionally, the respective slide member of each of the front deck stabilizer assembly and the rear deck stabilizer assembly is disposed within a radial gap between the support post and an outer sleeve. The support post and the outer sleeve are both fixedly secured to the chassis.

As used herein, value modifiers such as "about," "substantially," and "approximately" inserted before a numerical value indicate that the value can represent other values within a designated threshold range above and/or below the specified value, such as values within 5%, 10%, or 15% of the specified value.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Other embodiments and modifications may be apparent to those of ordinary skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Directional terms such as "left", "top", "upper", and the like, are provided to facilitate understanding and refer to the illustrated orientations, but may not impose positional requirements on the objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A transport trailer comprising:
   a chassis;
   a deck having a width extending from a first edge of the deck to a second edge of the deck;
   a lifting assembly mechanically coupled to the deck and the chassis and configured to selectively raise and lower the deck relative to the chassis; and
   a stabilizer assembly comprising a support post and a slide member, the support post laterally disposed between the first and second edges of the deck and extending from the chassis to a top end of the support post, the slide member coupled to the deck and configured to translate along a length of the support post as the deck is raised and lowered to stabilize the deck,
   wherein an upper surface of the deck is above the top end of the support post when the deck is in a raised position and is below the top end of the support post when the deck is in a lowered position.

2. The transport trailer of claim 1, wherein the deck defines an aperture sized and positioned to enable the support post to pass through the aperture without physically contacting the deck.

3. The transport trailer of claim 1, wherein the lifting assembly comprises a linear actuator and a scissor linkage, the scissor linkage including at least a first link member and a second link member coupled to each other and to the linear actuator at a pivot joint, wherein an end of the first link member opposite the pivot joint is coupled to the chassis and an end of the second link member opposite the pivot joint is coupled to the deck.

4. The transport trailer of claim 1, wherein the slide member surrounds at least a majority of a circumference of the support post, wherein one of the slide member or the support post includes at least one rail that protrudes from a surface thereof towards the other of the slide member or the support post, the at least one rail elongated along a length of the slide member or the support post from which the at least one rail protrudes.

5. The transport trailer of claim 1, wherein the slide member is disposed within a radial gap between the support post and an outer sleeve of the stabilizer assembly, the support post and the outer sleeve both fixedly secured to the chassis.

6. The transport trailer of claim 1, wherein the stabilizer assembly is a first stabilizer assembly located proximate to the first edge of the deck, and the transport trailer further comprises a second stabilizer assembly located across from the first stabilizer assembly proximate to the second edge of the deck.

7. The transport trailer of claim 6, wherein a distance between the support post of the first stabilizer assembly and a support post of the second stabilizer assembly is no greater than eight feet.

8. The transport trailer of claim 1, wherein the deck is a rear deck and the transport trailer further comprises a front deck disposed between the rear deck and a coupler configured to mechanically connect to a propulsion-generating vehicle, wherein when the rear deck is in the raised position, a vehicle on the upper surface of the rear deck can traverse over the top end of the support post onto the front deck.

9. The transport trailer of claim 8, wherein the lifting assembly is a rear deck lifting assembly and the transport trailer further comprises a front deck lifting assembly mechanically coupled to the front deck and the chassis, the front deck lifting assembly configured to selectively raise and lower the front deck relative to the chassis independently of the rear deck.

10. The transport trailer of claim 9, wherein the front deck lifting assembly comprises a linear actuator and a scissor linkage, the scissor linkage including at least a first link member and a second link member coupled to each other and to the linear actuator at a pivot joint, wherein an end of the first link member opposite the pivot joint is coupled to the chassis and an end of the second link member opposite the pivot joint is coupled to the front deck.

11. A transport trailer comprising:
a chassis;
a deck;
a lifting assembly comprising a linear actuator and a scissor linkage and configured to selectively raise and lower the deck relative to the chassis, the scissor linkage including at least a first link member and a second link member coupled to each other and to the linear actuator at a pivot joint, wherein an end of the first link member opposite the pivot joint is coupled to the chassis and an end of the second link member opposite the pivot joint is coupled to the deck; and
a stabilizer assembly comprising a support post and a slide member, the support post extending from the chassis to a top end of the support post, the slide member coupled to the deck and configured to translate along a length of the support post as the deck is raised and lowered to stabilize the deck.

12. The transport trailer of claim 11, wherein the deck has a width extending from a first edge of the deck to a second edge of the deck, and the support post is laterally disposed between the first and second edges of the deck.

13. The transport trailer of claim 12, wherein the deck defines an aperture sized and positioned to enable the support post to pass through the aperture without physically contacting the deck.

14. The transport trailer of claim 11, wherein an upper surface of the deck is above the top end of the support post when the deck is in a raised position and is below the top end of the support post when the deck is in a lowered position.

15. The transport trailer of claim 11, wherein the slide member is disposed within a radial gap between the support post and an outer sleeve of the stabilizer assembly, the support post and the outer sleeve both fixedly secured to the chassis.

16. The transport trailer of claim 11, wherein the stabilizer assembly is a first stabilizer assembly located proximate to a first edge of the deck, and the transport trailer further comprises a second stabilizer assembly located across from the first stabilizer assembly proximate to a second edge of the deck.

17. The transport trailer of claim 16, wherein a distance between the support post of the first stabilizer assembly and a support post of the second stabilizer assembly is no greater than eight feet.

18. A transport trailer comprising:
a chassis;
a front deck;
a rear deck disposed rearward of the front deck along a length of the chassis;
a front deck lifting assembly mechanically coupled to the front deck and the chassis and configured to selectively raise and lower the front deck relative to the chassis;
a front deck stabilizer assembly comprising a support post and a slide member, the support post extending from the chassis to a top end of the support post, the slide member coupled to the front deck and configured to translate along a length of the support post as the front deck is raised and lowered to stabilize the front deck, wherein an upper surface of the front deck is above the top end of the support post when the front deck is in a raised position and is below the top end of the support post when the front deck is in a lowered position;
a rear deck lifting assembly mechanically coupled to the rear deck and the chassis and configured to selectively raise and lower the rear deck relative to the chassis; and
a rear deck stabilizer assembly comprising a support post and a slide member, the support post extending from the chassis to a top end of the support post, the slide member coupled to the rear deck and configured to translate along a length of the support post as the rear deck is raised and lowered to stabilize the rear deck, wherein an upper surface of the rear deck is above the top end of the support post when the rear deck is in a raised position and is below the top end of the support post when the rear deck is in a lowered position,
wherein, when the rear deck is in the raised position, a vehicle on the upper surface of the rear deck can traverse over the top end of the support post of the rear deck stabilizer assembly onto the front deck.

19. The transport trailer of claim 18, wherein each of the front deck lifting assembly and the rear deck lifting assembly includes a linear actuator and a scissor linkage.

20. The transport trailer of claim 18, wherein the respective slide member of each of the front deck stabilizer assembly and the rear deck stabilizer assembly is disposed within a radial gap between the support post and an outer sleeve, the support post and the outer sleeve both fixedly secured to the chassis.

* * * * *